(12) United States Patent
Kufeld et al.

(10) Patent No.: US 9,469,698 B2
(45) Date of Patent: Oct. 18, 2016

(54) PROCESS FOR FORMING POLYOLEFINS

(71) Applicant: Chevron Phillips Chemical Company, LP, The Woodlands, TX (US)

(72) Inventors: Scott E. Kufeld, Houston, TX (US); Joel A. Mutchler, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 156 days.

(21) Appl. No.: 14/264,537

(22) Filed: Apr. 29, 2014

(65) Prior Publication Data

US 2015/0307637 A1    Oct. 29, 2015

(51) Int. Cl.
| | |
|---|---|
| *C08F 2/01* | (2006.01) |
| *C08F 10/02* | (2006.01) |
| *C08L 23/04* | (2006.01) |
| *C08F 2/00* | (2006.01) |
| *C08L 23/00* | (2006.01) |
| *C08L 23/10* | (2006.01) |
| *C08F 210/16* | (2006.01) |

(52) U.S. Cl.
CPC ............. *C08F 2/01* (2013.01); *C08F 2/001* (2013.01); *C08L 23/00* (2013.01); *C08L 23/04* (2013.01); *C08L 23/10* (2013.01)

(58) Field of Classification Search
CPC .... C08F 2/001; C08F 210/02; C08F 210/06; C08F 2500/05
USPC ...................................................... 526/60, 65
See application file for complete search history.

(56) References Cited

U.S. PATENT DOCUMENTS

| | | | |
|---|---|---|---|
| 3,804,881 A | 4/1974 | Bassett et al. | |
| 5,151,474 A * | 9/1992 | Lange ................. | B01J 19/0006 526/59 |
| 5,525,678 A * | 6/1996 | Mink ...................... | C08F 10/00 525/246 |
| 6,649,710 B2 | 11/2003 | Morterol | |
| 7,400,941 B2 * | 7/2008 | Battiste .................. | B29C 47/92 264/408 |
| 7,786,227 B2 | 8/2010 | Buchelli et al. | |
| 8,318,874 B2 | 11/2012 | Klosin et al. | |
| 8,492,489 B2 * | 7/2013 | Fouarge ................. | C08F 10/02 422/132 |
| 2007/0203299 A1 | 8/2007 | Mavridis et al. | |
| 2011/0269921 A1 | 11/2011 | Mileo et al. | |

FOREIGN PATENT DOCUMENTS

| | | |
|---|---|---|
| EP | 1041090 | 10/2000 |
| EP | 2336200 | 6/2011 |
| WO | 9829464 | 7/1998 |

OTHER PUBLICATIONS

International Application PCT/US2015/027799 Search Report dated Oct. 20, 2015.

* cited by examiner

*Primary Examiner* — Fred M Teskin
(74) *Attorney, Agent, or Firm* — Monte R. Rhodes

(57) ABSTRACT

Processes of forming polyolefins are described herein. One or more specific embodiments of the processes generally include introducing olefin monomer selected from $C_2$-$C_3$ olefins into a first reaction zone under first polymerization conditions to form a first polyolefin; withdrawing a transfer effluent from the first reaction zone, the transfer effluent including first polyolefin and unreacted olefin monomer; introducing the transfer effluent, a comonomer selected from $C_4$-$C_8$ olefins, and additional olefin monomer to a second reaction zone under second polymerization conditions to form a second reactor product; maintaining an essentially constant comonomer:olefin monomer ratio in the second reaction zone; and withdrawing at least a portion of the second reactor product, wherein the second reactor product includes a bimodal polyolefin.

27 Claims, 2 Drawing Sheets

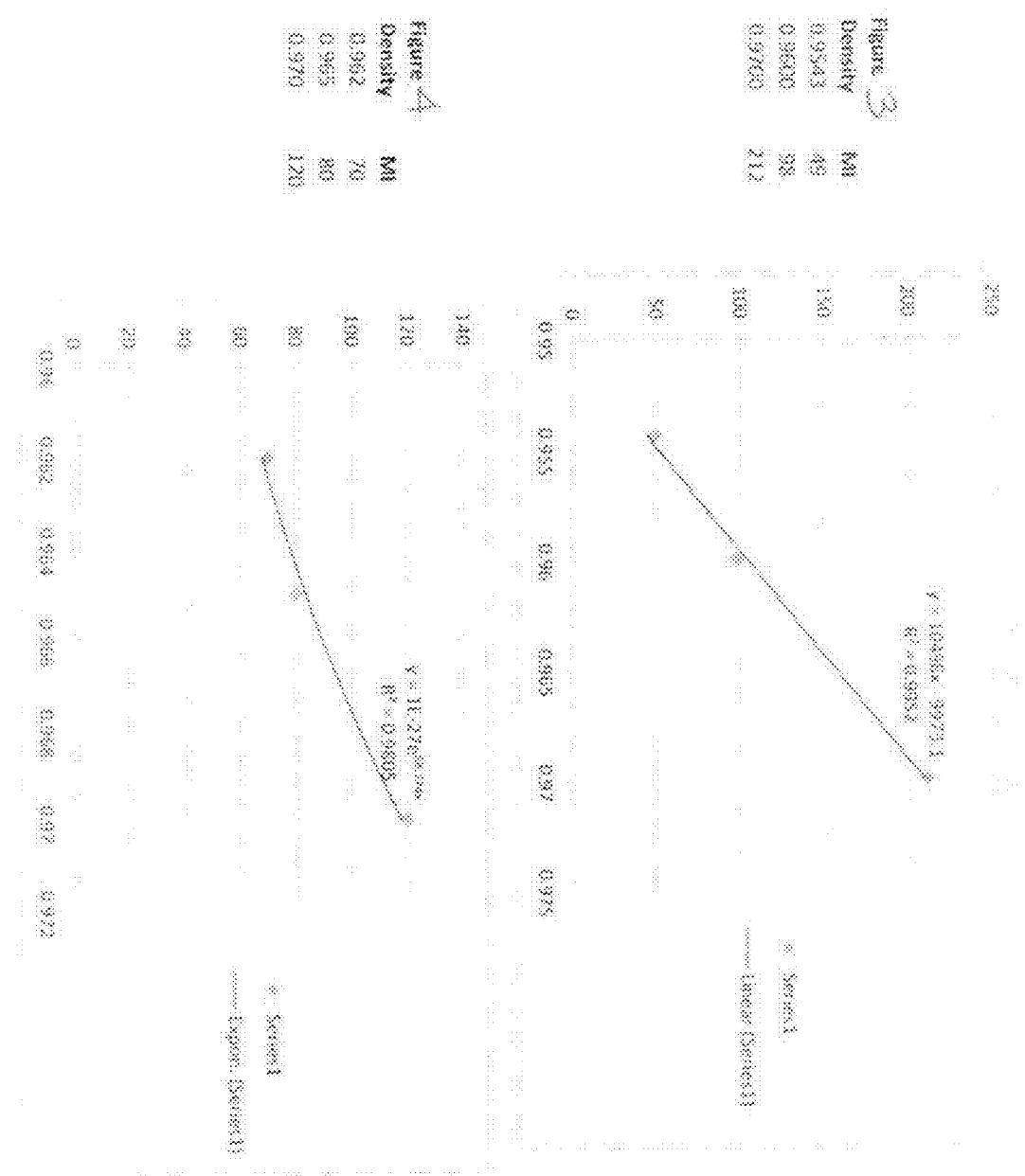

PROCESS FOR FORMING POLYOLEFINS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

The present invention generally relates to processes for forming polyolefins and controlling characteristics of the formed polyolefins. In particular, embodiments relate to processes for controlling polyolefin characteristics in multimodal polymerization processes.

2. Related Art

This section introduces information from the art that may be related to or provide context for some aspects of the techniques described herein and/or claimed below. This information is background facilitating a better understanding of that which is disclosed herein. This is a discussion of "related" art. That such art is related in no way implies that it is also "prior" art. The related art may or may not be prior art. The discussion is to be read in this light, and not as admissions of prior art.

Olefin polymerization processes are well known and numerous methods have been disclosed in the literature relating to controlling such reactions. However, real-time control of polymer characteristics has been difficult. Process variables in the reaction zone can change suddenly and their effect on the monomer concentration in the reaction zone may not be detected and quickly addressed. Such delayed monomer concentration analysis may cause less than desired reaction production and/or polyolefin property control. Accordingly, there is a need for better monomer concentration analysis and control.

The present invention is directed to resolving, or at least reducing, one or all of the problems mentioned above.

SUMMARY

Various embodiments of the present invention include processes of forming polyolefins. The processes generally include introducing olefin monomer selected from $C_2$-$C_3$ olefins into a first reaction zone under first polymerization conditions to form a first polyolefin; withdrawing a transfer effluent from the first reaction zone, the transfer effluent including first polyolefin and unreacted olefin monomer; introducing the transfer effluent, a comonomer selected from $C_4$-$C_8$ olefins, and additional olefin monomer to a second reaction zone tinder second polymerization conditions to form a second reactor product; maintaining an essentially constant comonomer:olefin monomer ratio in the second reaction zone; and withdrawing at least a portion of the second reactor product, wherein the second reactor product includes a bimodal polyolefin.

One or more embodiments include the process of any preceding paragraph, wherein the olefin monomer includes ethylene.

One or more embodiments include the process of any preceding paragraph, wherein the comonomer includes hexene.

One or more embodiments include the process of any preceding paragraph, wherein the first reaction zone, the second reaction zone or a combination thereof include a loop slurry reaction vessel.

One or more embodiments include the process of any preceding paragraph, wherein the second reaction zone comprises a loop slurry reaction vessel and the loop slurry reaction vessel comprises a plurality of olefin feed locations, comonomer feed locations or a combinations thereof.

One or more embodiments include the process of any preceding paragraph, wherein maintaining a comonomer:olefin monomer ratio essentially constant includes determining a concentration of carry over olefin monomer in the transfer effluent; and adjusting a rate of introduction of the additional olefin monomer into the second reaction zone, adjusting a rate of introduction of the comonomer into the second reaction zone or a combination thereof in response to the carry over olefin monomer concentration.

One or more embodiments include the process of any preceding paragraph, wherein the carry over olefin monomer concentration is determined by a process including irradiating in-situ the transfer effluent; measuring scattered energy from the transfer effluent; and determining from the measured scattered energy the carry over olefin monomer concentration.

One or more embodiments include the process of any preceding paragraph, wherein the carry over olefin monomer concentration is determined by calculating the production rate of first polyolefin in the first reaction zone.

One or more embodiments include the process of any preceding paragraph, wherein the production rate of the first polyolefin in the first reaction zone is determined from the calculated reaction quotient ($Q_{rxn}$) and the heat of polymerization per unit of polyolefin produced.

One or more embodiments include the process of any preceding paragraph, wherein the carry over olefin monomer concentration is determined by performing an energy balance calculation for the first reaction zone.

One or more embodiments include the process of any preceding paragraph, wherein the bimodal polyolefin includes a first polyethylene fraction having an average molecular weight of from 15,000 to 50,000 and a second polyethylene fraction having an average molecular weight of greater than 100,000.

One or more embodiments include the process of any preceding paragraph, wherein the bimodal polyolefin includes at least 40% first polyethylene fraction.

One or more embodiments include the process of any preceding paragraph, wherein the bimodal polyolefin includes from 40% to 60% of the first polyethylene fraction.

One or more embodiments include bimodal polyolefins formed by the process of any preceding paragraphs.

One or more embodiments include processes of forming polyolefins including introducing olefin monomer selected from $C_2$-$C_3$ olefins into a reaction zone under polymerization conditions to form a polyolefin; introducing a comonomer selected from $C_4$-$C_8$ olefins into the reaction zone; and maintaining an essentially constant comonomer:olefin monomer ratio in the reaction zone by determining a concentration of olefin monomer introduced into the reaction zone; and adjusting a rate of introduction of olefin monomer into the reaction zone, adjusting a rate of introduction of the comonomer into the reaction zone or a combination thereof in response to the concentration of olefin monomer concentration introduced into the reaction zone.

One or more embodiments include the process of the preceding claim, wherein the olefin monomer concentration is determined by a process including irradiating in-situ the input stream; measuring scattered energy from the input stream; and determining from the measured scattered energy the olefin monomer concentration.

One or more embodiments include a process of forming polyolefins including introducing olefin monomer selected from $C_2$-$C_3$ olefins and hydrogen into a first reaction zone under first polymerization conditions to form a first polyolefin; withdrawing a transfer effluent from the first reaction zone, the transfer effluent including first polyolefin and unreacted olefin monomer; introducing the transfer effluent, a comonomer selected from $C_4$-$C_8$ olefins, and additional olefin monomer to a second reaction zone under second polymerization conditions to form a second reactor product; determining a melt index of the first polyolefin in the transfer effluent, the first reaction zone or a combination thereof; correlating density of the first polyolefin with the melt index of the first polyolefin; and adjusting a rate of introduction of the hydrogen into the first reaction zone in response to the melt index of the first polyolefin and a pre-determined bimodal polyolefin density; and withdrawing at least a portion of the second reactor product, wherein the second reactor product comprises the bimodal polyolefin.

One or more embodiments include the process of the preceding claim further including separating at least a portion of the transfer effluent to form a lighter stream and a heavier stream; and determining a melt index of the first polyolefin in the heavier stream.

One or more embodiments include the process of any preceding claim, wherein the heavier stream is introduced into the second reaction zone.

One or more embodiments include the process of any preceding claim, wherein the separating includes passing the at least a portion of the transfer effluent through a flash tank, a hydrocyclone or a combination thereof to form the lighter stream and the heavier stream.

One or more embodiments include a process of forming polyolefins including introducing olefin monomer selected from $C_2$-$C_3$ olefins and hydrogen into a first reaction zone under first polymerization conditions to form a first polyolefin; withdrawing a transfer effluent from the first reaction zone, the transfer effluent including first polyolefin and unreacted olefin monomer; withdrawing a second effluent from the first reaction zone; separating at least a portion of the second effluent to form a lighter stream and a heavier stream; introducing the transfer effluent, a comonomer selected from $C_4$-$C_8$ olefins, and additional olefin monomer to a second reaction zone under second polymerization conditions to form a second reactor product; determining a melt index of the first polyolefin in the heavier stream; correlating density of the first polyolefin with the melt index of the first polyolefin; and adjusting a rate of introduction of the hydrogen into the first reaction zone in response to the melt index of the first polyolefin and a predetermined bimodal polyolefin density; and withdrawing at least a portion of the second reactor product, wherein the second reactor product comprises the bimodal polyolefin.

One or more embodiments include the process of any preceding claim, wherein the separating includes passing the at least a portion of the transfer effluent through a flash tank, a hydrocyclone or a combination thereof to form the lighter stream and the heavier stream.

One or more embodiments include a process of controlling bimodal polyolefin density including introducing olefin monomer selected from $C_2$-$C_3$ olefins into a first reaction zone under first polymerization conditions to form a first polyolefin exhibiting a first density; withdrawing a transfer effluent from the first reaction zone, the transfer effluent including first polyolefin and unreacted olefin monomer; introducing the transfer effluent, a comonomer selected from $C_4$-$C_8$ olefins, and additional olefin monomer to a second reaction zone under second polymerization conditions to form a second polyolefin exhibiting a second density; withdrawing at least a portion of a second reactor product from the second reaction zone, wherein the second reactor product comprises a bimodal polyolefin including the first polyolefin and the second polyolefin and exhibiting a bimodal polyolefin density; controlling the bimodal polyolefin density within a target density by a process including maintaining an essentially constant second density within the second reaction zone by maintaining an essentially constant comonomer:olefin monomer ratio in the second reaction zone; determining a melt index of the first polyolefin in the transfer effluent, the first reaction zone or a combination thereof; correlating the first density with the melt index of the first polyolefin; and adjusting a rate of introduction of the hydrogen into the first reaction zone in response to the melt index of the first polyolefin and the target density.

One or more embodiments include the process of any preceding claim, wherein maintaining a comonomer:olefin monomer ratio essentially constant includes determining a concentration of carry over olefin monomer in the transfer effluent; and adjusting a rate of introduction of the additional olefin monomer into the second reaction zone, adjusting a rate of introduction of the comonomer into the second reaction zone or a combination thereof in response to the carry over olefin monomer concentration.

One or more embodiments include the process of any preceding claim, wherein the carry over olefin monomer concentration is determined by a process including irradiating in-situ the transfer effluent; measuring scattered energy from the transfer effluent; and determining from the measured scattered energy the carry over olefin monomer concentration.

One or more embodiments include the process of any preceding claim, wherein the carry over olefin monomer concentration is determined by calculating the production rate of first polyolefin in the first reaction zone.

One or more embodiments include the process of any preceding claim, wherein the production rate of the first polyolefin in the first reaction zone is determined from the calculated reaction quotient ($Q_{rxn}$) and the heat of polymerization per unit of polyolefin produced.

One or more embodiments include the process of any preceding claim, wherein the carry over olefin monomer concentration is determined by performing an energy balance calculation for the first reaction zone.

One or more embodiments include the process of any preceding claim, wherein the bimodal polyolefin includes a first polyethylene fraction having an average molecular weight of from 15,000 to 50,000 and a second polyethylene fraction having an average molecular weight of greater than 100,000.

One or more embodiments include the process of any preceding claim, wherein the bimodal polyolefin includes at least 40% first polyethylene fraction.

One or more embodiments a bimodal polyolefin formed from the process of any preceding claim.

The above paragraphs present a simplified summary of the presently disclosed subject matter in order to provide a basic understanding of some aspects thereof. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The claimed subject matter may be understood by reference to the following description taken in conjunction with the accompanying drawings, in which like reference numerals identify like elements, and in which:

FIG. 3 illustrates an essentially linear correlation of density and melt index for a hypothetical system.

FIG. 4 illustrates a non-linear correlation of density and melt index for a hypothetical system.

Figure 1:
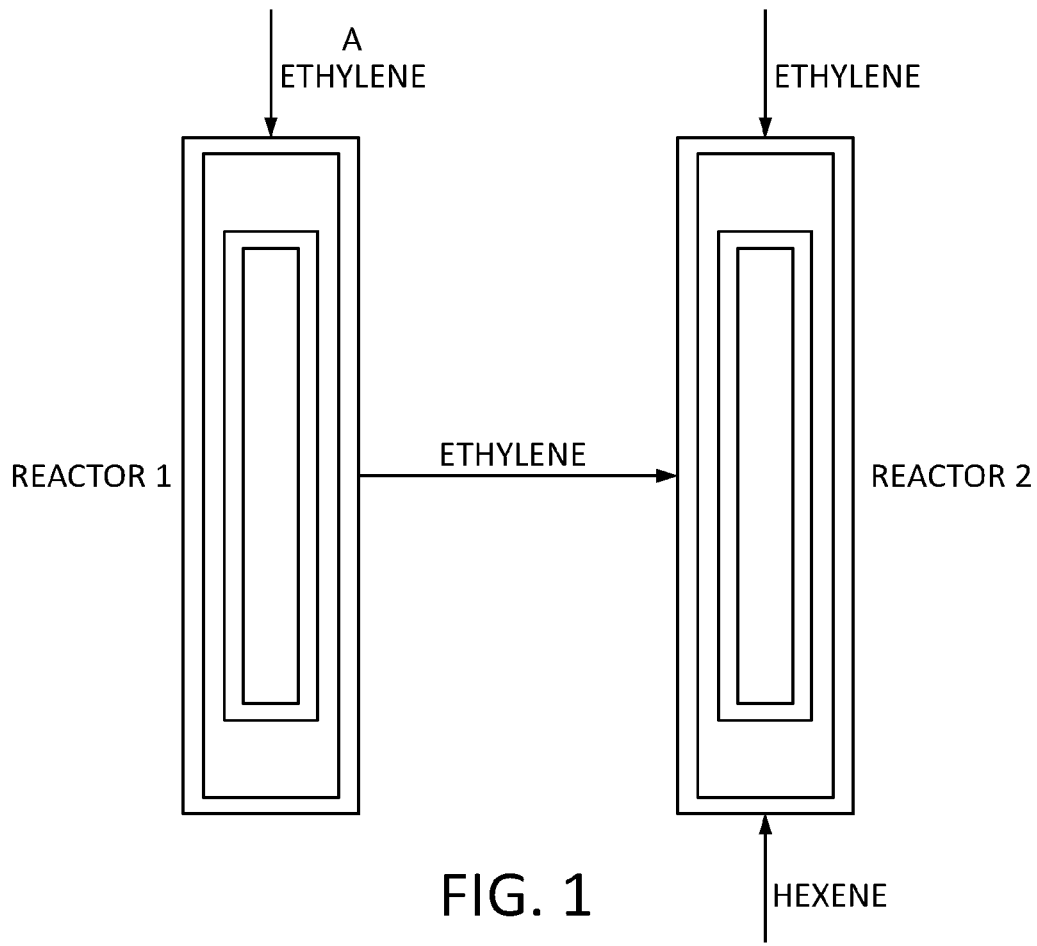
FIG. 1 illustrates a schematic of a simplified polyolefin process for use in polymerization illustrations.

While the claimed subject matter is susceptible to various modifications and alternative forms, the drawings illustrate specific embodiments herein described in detail by way of example. It should be understood, however, that the description herein of specific embodiments is not intended to limit the claimed subject matter to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In the description below, unless otherwise specified, all compounds described herein may be substituted or unsubstituted and the listing of compounds includes derivatives thereof. Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Embodiments described herein include processes of forming polyolefins (i.e., polymerization processes). As known in the art, olefin polymerization processes include contacting an olefin monomer with a catalyst system within a reaction zone to form the polyolefin. Catalyst systems may include any catalyst system(s) useful for polymerizing olefin monomers. For example, the catalyst systems may be selected from chromium based catalyst systems, single site transition metal catalyst systems including metallocene catalyst systems, Ziegler-Natta catalyst systems and combinations thereof, for example. As known in the art the catalysts may be activated for subsequent polymerization and may or may not be associated with a support material for example.

Once the catalyst system is prepared, as described above and/or as known to one skilled in the art, a variety of polymerization processes may be carried out using that catalyst system. The polymerization conditions (e.g., equipment, process conditions, reactants, additives and other materials used in polymerization processes) will vary in a given process, depending on the desired composition and properties of the polymer being formed. Such processes may include solution phase, gas phase, shiny phase, bulk phase, high pressure processes or combinations thereof for example.

Slurry phase processes (also referred to as particle form polymerization) generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may be a diluent for the solid polymer particles that is separate from and in addition to the unreacted monomers. Suitable diluents included those known in the art and include hydrocarbons which are inert and liquid or are super critical fluids under slurry polymerization conditions. For example, suitable diluents include isobutene, propane, n-pentane, i-pentane, neopentane and n-hexane. Alternatively, the liquid medium may be the unreacted monomer itself. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. In continuous loop reactors, feed materials, such as monomer and catalyst are introduced to the reactor and a product slurry containing solid polyolefin particles in the liquid medium is taken off. In continuous loop reactors, the various feed materials may be introduced to the loop reaction zone in various ways. For example, the monomer and catalyst may be introduced separately or together and the monomer and catalyst may be mixed with varying amounts of diluent prior to introduction to the reaction zone. In the loop reaction zone, the monomer and catalyst become dispersed in the fluid slurry. As they circulate through the loop reaction zone in the fluid slurry, the monomer reacts at the catalyst site in a polymerization reaction and the polymerization reaction yields solid polyolefin particles in the fluid slurry. The loop reactor may be maintained at a pressure of from about 27 bar to about 50 bar or from about 35 bar to about 45 bar and a temperature of from about 38° C. to about 121° C., for example. Depending on the selection of diluent, monomer and optional comonomer, the reactor may also be operated at super-critical conditions. Reaction heat may be removed through the loop wall via any suitable method, such as via a double-jacketed pipe or heat exchanger, for example. Additional details regarding loop reactor apparatus and polymerization processes may be found, for example, in U.S. Pat. No. 4,674,290, U.S. Pat. No. 5,183,866, U.S. Pat. No. 5,455,314, U.S. Pat. No. 5,565,174, U.S. Pat. No. 6,045,661, U.S. Pat. No. 6,051,631, U.S. Pat. No. 6,114,501, and U.S. Pat. No. 6,262,191, which are incorporated in their entirety herein.

Alternatively, other types of polymerization processes may be used, such as stirred reactors in series, parallel or combinations thereof, for example. Upon removal from the reactor, the polyolefin may be passed to a polymer recovery system for further processing, such as addition of additives and/or extrusion, for example. Such processes are known to one skilled in the art and therefore are not described in detail herein.

The olefin monomers utilized in the processes described herein may be selected from $C_2$ to $C_{30}$ olefin monomers, or $C_2$ to $C_{12}$ olefin monomers (e.g., ethylene, propylene, butene, pentene, 4-methyl-1-pentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norbornene, dicyclopentadiene and cyclopentene, for example. The formed polyolefin may include homopolymers, copolymers or terpolymers, for example. In one or more embodiments, the olefin monomers are selected from $C_2$-$C_3$ olefin monomers.

In one or more embodiments, the processes described herein include the homopolymerization of ethylene. In alternative embodiments, the processes described herein include the copolymerization of ethylene and a higher 1-olefin, such as butene, 1-pentene, 1-hexene, 1-octene or 1-decene, for example. For example, the process may include the copolymerization of ethylene and a starting amount of comonomer ranging from 0.01 wt. % to 10 wt. %, or from 0.01 wt. % to 5 wt. %, or from 0.1 wt. % to 4 wt. % (wherein the resulting copolymers may still be referred to as polyethylene).

The polyolefins (and blends thereof) formed via the processes described herein may include, but are not limited to, linear low density polyethylene (LLDPE), low density linear polyethylene (LDLPE), elastomers, plastomers, high density polyethylenes (HDPE), low density polyethylenes (LDPE), medium density polyethylenes (MDPE), polypropylene and polypropylene copolymers, for example.

One or more embodiments include polymerizing an olefin monomer in a plurality of reaction zones under polymerization conditions to form multi-modal polyolefins. Embodiments described herein are uniquely capable of forming and maintaining the production of multi-modal polyolefins having a desired set of characteristics. The desired set of characteristics can include any of a variety of properties, including but not limited to, density and melt index, for example.

A single composition including a plurality of molecular weight peaks is considered to be a "multi-modal" polyolefin. Multi-modal polyolefins may be produced via a variety of processes, such as polymerization processes utilizing multi-modal catalyst systems (i.e., catalyst systems including at least two different catalytically active metal components). However, embodiments described herein employ at least two reaction zones, each having its own set of polymerization conditions, to form the multi-modal polyolefins. The reaction zones may be connected in series, such that a transfer effluent from a reaction zone, such as a first reaction zone, is transferred to a subsequent reaction zone, such as a second reaction zone, and so forth, until the multi-modal polyolefin product is discharged from a final reaction zone with the desired set of characteristics.

One or more embodiments include processes of forming bimodal polyolefins. As used herein, the term "bimodal polyolefin" refers to a single polyolefin composition including at least one identifiable high molecular weight fraction and at least one identifiable low molecular weight fraction. Accordingly, such embodiments utilize a first reaction zone connected in series to a second reaction zone so that the transfer effluent withdrawn from the first reaction zone (which generally includes a first polyolefin and unreacted olefin monomer) is introduced into the second reaction zone and a second reactor product formed in the second reaction zone is withdrawn therefrom and includes the bimodal polyolefin. In the preparation of bimodal polyolefins, the high molecular weight fraction and the low molecular weight fraction can be prepared in any order in the reaction zones, e.g., the low molecular weight fraction may be formed in a first reaction zone and the high molecular weight fraction in a second reaction zone, or vice versa, for example.

A comonomer that varies from the olefin monomer but is selected from, the same components may also be introduced into the second reaction zone. In one or more embodiments, the comonomer is selected from those described previously herein. For example, the comonomer may be selected from $C_4$-$C_8$ olefin monomers. In one or more specific embodiments, the comonomer may include butene or hexene.

The first reaction zone is generally operated under first polymerization conditions while the second reaction zone is generally operated under second polymerization conditions. The first polymerization conditions and the second polymerization conditions will be adapted to form polyolefins having the desired set of characteristics. As such, the first polymerization conditions and the second polymerization conditions may vary from one another. However, it is contemplated that in certain circumstances the first and second polymerization conditions may be similar, if not the same. For example, in one or more embodiments, the same catalyst system is utilized in the plurality of reaction zones. However, in other embodiments, different catalyst systems are used in the plurality of reaction zones.

In one or more embodiments, the reaction zones are independently selected from loop reactors. In one or more specific embodiments, each reaction zone is a loop reactor. As stated previously herein, while the present discussion may primarily focus on two reaction zones in series, the present techniques may be applicable to more than two reaction zones in series. The loop reactors may or may not have the same dimensions, including but not limited to volume, length, diameter, height, number of reactor segments, configuration of the layout in the vertical and horizontal directions and others, for example.

In one or more embodiments, the polymerization process includes separation. The separation can occur at any point within the process. For example, separation may occur after withdrawing the second reactor product from the second reaction zone. Alternatively (in combination therewith), the process may include separating the first reactor product, either within the transfer effluent or another stream withdrawn from the first reaction zone. Such separation can be accomplished by methods known in the art and may include, without limitation, concentration devices, such as hydrocyclones, flashing devices and combinations thereof, for example. Such processes are known to one skilled in the art and therefore are not described in detail herein.

One or more specific embodiments include separating at least a portion of the transfer agent to form a lighter stream and a heavier stream. The heavier stream is then introduced into the second reaction zone. Alternative embodiments include withdrawing a second effluent from the first reaction zone, which is then separated to form a lighter stream and a heavier stream, while the transfer effluent may then be introduced directly to the second reaction zone (without separation), or alternatively may undergo separation prior to introduction into the second reaction zone as well.

The characteristics/properties of polyolefins produced in polymerization process are a function of at least reaction zone conditions and the ratio of comonomer:olefin monomer. Process variables in a reaction zone can change suddenly and their effect on the olefin monomer concentration in the reaction zone may not be detected by measurement technology. The tables below illustrate the results of simulations wherein various process conditions change and the effect on the feed rate (e.g., comonomer:olefin monomer concentration in the second reaction zone) in the absence of quick control and correction.

FIG. 1 illustrates a simplified schematic polymerization process for use in the following simulations. Ethylene is introduced in Stream A to a first reaction zone, Reactor 1, under first polymerization conditions (95° C., 615 psia, 120-200 ppm cocatalyst (TEAl, TEB, TiBAl), 3-4 wt. % $C_2$, 1-5 mol % $H_2$) to form polyethylene (HDPE, <0.3 HLMI, <0.927 g/cc density) present in transfer effluent, which is transferred to a second reaction zone, Reactor 2, under second polymerization conditions (85° C., 615 psia, 300-400 ppm cocatalyst (TEAl, TEB, TiBAl), 0.5-1.5 wt. % $C_2$, 2-4 wt. % $C_6$) to form the second reactor product including the bimodal polyethylene (LLDPE, >50 MI, >0.960 g/cc density). Comonomer hexene is introduced into the second reaction zone, Reactor 2, as well as additional olefin monomer.

TABLE 1

The initial ethylene feed rate to reaction zone 1 remained constant

| Stream | Feed rate (lb/hr) | Feed rate (lb/hr) | Feed rate (lb/hr) |
|---|---|---|---|
| Olefin monomer | 100,000 | 100,000 | 100,000 |
| Overflow ethylene | 6,000 | 1,000 | 1,000 |
| Additional monomer | 94,000 | 94,000 | 99,000 |
| Comonomer | 3,000 | 3,000 | 3,000 |
| Wt. Ratio of comonomer:ethylene in R2 | 0.030 | 0.032 | 0.30 |
| % change | | 5.3 | |

In Table 1, as the rate of reaction in reaction zone 1 increased, less overflow ethylene was introduced into reaction zone 2. Table 1 reflects a situation where the comonomer introduction does not timely adjust to the change in overflow ethylene feed rate, resulting in the polyolefin not meeting predetermined characteristics.

TABLE 2

The initial ethylene feed rate to reaction zone 1 remained constant

| Stream | Feed rate (lb/hr) | Feed rate (lb/hr) | Feed rate (lb/hr) |
|---|---|---|---|
| Olefin monomer | 100,000 | 75,000 | 75,000 |
| Overflow ethylene | 4,000 | 3,000 | 3,000 |
| Additional monomer | 96,000 | 72,000 | 72,000 |
| Comonomer | 3,000 | 3,000 | 2,500 |
| Ratio of comonomer:ethylene in R2 | 0.030 | 0.040 | 0.30 |
| % change | | 33.3 | |

In Table 2, as the introduction of olefin monomer into reaction zone 1 is interrupted, the overflow ethylene concentration drops and a lag occurs before comonomer and monomer introduction is adjusted, resulting in polyolefin not meeting predetermined characteristics.

TABLE 3

The initial ethylene feed rate to reaction zone 1 remained constant

| Stream | Feed rate (lb/hr) | Feed rate (lb/hr) | Feed rate (lb/hr) |
|---|---|---|---|
| Olefin monomer | 100,000 | 100,000 | 100,000 |
| Overflow ethylene | 4,000 | 20,000 | 20,000 |
| Additional monomer | 96,000 | 96,000 | 80,000 |
| Comonomer | 3,000 | 3,000 | 2,500 |
| Ratio of comonomer:ethylene in R2 | 0.030 | 0.026 | 0.30 |
| % change | | −13.8 | |

In Table 3, as the reaction rate of reaction zone 1 decreased, the overflow ethylene increased and a lag was observed before comonomer introduction was adjusted, resulting in polyolefin not meeting predetermined characteristics.

Unfortunately, it can be difficult to measure polymer characteristics, such as properties, in the process or at intermediated stages thereof in real time. Accordingly, a delay in process adjustments as a result of such changing polymer characteristics can cause less than desired reaction production and polyolefin property control. However, real time, on-line prediction and control of monomer concentration within a polymerization process are substantially improved utilizing the embodiments of the invention.

As stated previously herein, embodiments described herein are uniquely capable of forming and maintaining the production of multi-modal polyolefins having a desired set of characteristics. Accordingly, one or more embodiments include maintaining an essentially constant comonomer:olefin monomer ratio (i.e., the "ratio") in the second reaction zone (when referring to a bimodal system and which may be accordingly adjusted when referring to systems having more than two reaction zones). As used herein, the term "essentially constant" refers to a ratio or property that varies by not more than 20%, or not more than 10%, or not more than 5%, or not more than 2%, under standard operating conditions. For example, the comonomer:olefin monomer weight ratio in the second reaction zone may be maintained at a ratio of from 0.005:1 to 100:1 or from 0.5:100 to 100:1, or from 1:1 to 10:1, or from 1.33:1 to 8:1, or from 1.5:1 to 5:1, for example.

The variance of the comonomer:olefin monomer ratio in the second reaction zone may be calculated by a variety of methods, including, but not limited to: (1) the difference between the highest and lowest ratios "under standard operating conditions" when divided by the lowest ratio, (2) the difference between the highest and lowest ratios "under standard operating conditions" when divided by the highest ratio, (3) the difference between the highest and lowest ratios "under standard operating conditions" when divided by an average of the lowest and highest ratios, or (4) the ratio varies from a target set point. For example, the variance in the comonomer:olefin monomer ratio in the second reactor when utilizing the $4^{th}$ type of calculation wherein the target set point is the ratio at the start of the polymerization process and is 1:1, for example and the ratio at a later time is 0.75:1 results in a variance of 25%.

As used in the present embodiments, the olefin monomer is the olefin with the highest molar concentration in the polyolefin while the comonomer is any olefin whose molar concentration in the polymer is less than that of the olefin monomer. Although the calculations and discussion have focused on a monomer/single comonomer system, the teachings of this disclosure are equally applicable to a monomer/multiple comonomer system.

As with other process conditions and polymer properties, there are few practical ways to measure the comonomer:olefin monomer ratio directly. However, the ratio can be determined from a variety of methods, such as analysis/spectroscopy or material or energy or heat balance calculations, for example. Currently, the feed rates or operating conditions that affect the ratio are adjusted manually based on a polymerization rate determined by assuming a constant conversion. This method for determining the polymerization rate may be adequate for long term (several reactor residence times) and average out because losses are constant and unreacted ethylene is recycled. However, it does not adequately reflect short term fluctuations in the polymerization rate.

In one or more embodiments, maintaining the essentially constant comonomer:olefin monomer ratio in the second reaction zone includes determining a concentration of carry over olefin monomer in the transfer effluent and adjusting a rate of introduction of the additional olefin monomer into the second reaction zone, adjusting a rate of introduction of the comonomer into the second reaction zone or a combination thereof in response to the carry over olefin monomer concentration.

The determination of the carry over olefin monomer concentration may be determined by an analysis method, such as Ramen spectroscopy. For example, in one or more embodiments, the carry over olefin monomer concentration is determined by a process that includes irradiating in-situ the transfer effluent, measuring scattered energy from the transfer effluent and determining from the measured scattered energy the carry over olefin monomer concentration.

In one or more embodiments, the carry over olefin monomer concentration is determined by calculating the production rate of first polyolefin in the first reaction zone. The production rate (PR) of the first polyolefin in the first reaction zone may be determined from the calculated reaction quotient ($Q_{rxn}$) and the heat of polymerization per unit of polyolefin produced (i.e., $PR = Q_{rxn}/\Delta H_{rxn}$). The calculated reaction quotient can be calculated from known equations and/or programs which may include the following equations:

$$Q_{rxn} = Q_{TOT} - Q_{no\ rxn}$$

$$Q_{rxn} = WCp(\Delta T_{TOT} - T_{no\ rxn})$$

In one or more embodiments, the carry over olefin monomer concentration is determined by performing an energy balance calculation for the first reaction zone. Such calculation can be done by an on-line computer program utilizing the energy balance around the reactor. The program can then calculate the feed rate required to maintain the desired properties and automatically adjust, the set point of the flow controller for the feed.

While the embodiments described herein are capable of maintaining an essentially constant comonomer:olefin monomer ratio in the second reaction zone, it is noted that the concentration of various components within the slurry may vary as the slurry flows around the loop reactor and some of the components are consumed by reaction. For example, in an illustrative 68137 liter (18,000 gallon) loop reactor being used for the slurry polymerization of ethylene, there are approximately 48,000 pounds (about 18,000 kg) of liquid with approximately 2,200 pounds (about 800 kg) of ethylene in the liquid. At a production rate of approximately 40,000 lbs/hr (about 15,000 kg/hr), the process consumes approximately 333 lbs (about 125 kg) of ethylene in the time it takes to flow around the reactor loop. The ethylene concentration in the loop is calculated to range between about 4.27 wt. % just before the ethylene feed location to about 4.93 wt. % just after the ethylene feed location.

One or more embodiments include a plurality of olefin monomer feed locations to the second reaction zone. In addition (or alternative thereto), the second reaction zone may include a plurality of comonomer feed locations, hydrogen feed locations or combinations thereof. It is contemplated that the first reaction zone may also include a plurality of olefin monomer feed locations. Alternatively, the first reaction zone may utilize a single olefin monomer feed location. As used herein, the term "single feed, location" refers to a feed location for a particular feed component, such as olefin monomer or comonomer, for example, and is not intended to limit the feed of separate components to that single feed location nor prohibit the feed of multiple components to that single feed location.

The plurality of feed locations can be utilized to feed components to the reaction zone at any location sufficient to maintain the desired continuity of slurry concentration throughout. Furthermore, the particular placement of each feed location will depend upon system specifics but will be selected so as to maintain the essentially constant olefin monomer:comonomer ratio, in one or more embodiments, the plurality of feed locations are spaced essentially equidistant over the length of the reactor.

In one or more embodiments, the plurality of feed locations includes two feed locations. In another embodiment, the plurality of feed locations includes more than two feed locations. For example, the plurality of feed locations may include 3, 4, 5 or 6 feed locations. Furthermore, the number of feed locations for each component need not be the same. For example, the second reaction zone may include 2 olefin monomer feed locations and a single comonomer feed location. Alternatively, the second reaction zone may include 4 olefin monomer feed locations and 2 comonomer feed locations or vice versa. However, it is contemplated that the second reaction zone may include the same number of feed locations for each component, such as 2 olefin monomer feed locations and 2 comonomer feed locations, for example.

The concentration of feed introduced at each feed location will be such as required to maintain the essentially constant monomer:comonomer ratio, as discussed previously herein. Such amount may be essentially the same at each feed location or may vary by an amount, such as not less than 20%, or less than 10%, or less than 5%, or less than 2%, for example.

Figure 2:
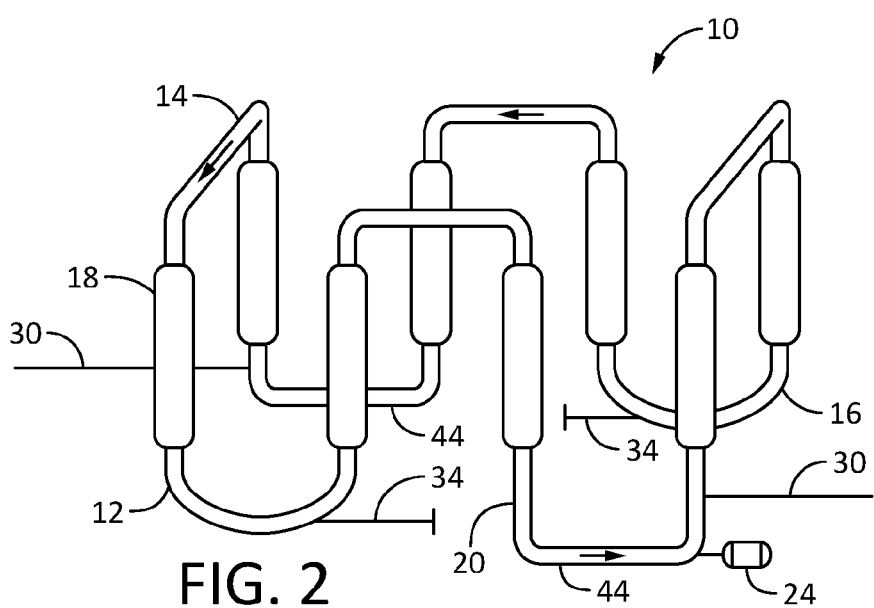
FIG. 2 illustrates a schematic of a specific embodiment of a loop reactor.

FIG. 2 illustrates an embodiment of a single loop reactor that can be utilized as the second reaction zone (and/or the first in particular embodiments) wherein a plurality of feed locations are utilized for a variety of the slurry components. In FIG. 2, the loop reactor 10 includes major segments 12, upper minor segments 14 and lower minor segments 16. The minor segments may simply be curved elbows that join the major segment and may be relatively curved to facilitate continuous take-off of product slurry. In FIG. 2, the loop reactor 10 has eight major segments, although it is contemplated that the present process and apparatus may be used with a loop reactor having a higher or lower number of major segments, for example, a loop reactor having four legs or twelve segments. It will further be understood that the particular numbering of segments herein does not necessarily imply a priority to the legs, as the loop reactor is circular.

The legs are surrounded with, cooling jackets 18 for heat exchange. Each segment or leg is connected to the next segment or leg by a smooth bend or elbow 20, thus providing a continuous flow path substantially free from internal obstructions. The fluid slurry is circulated by means of an impeller (not shown) driven by motor 24.

Monomer (which may be mixed with a diluent) is supplied to the reactor 10 through two monomer feeds (illustrated as the connection of conduit 30 to the loop reactor). Comonomer may be introduced via conduit 30 or via another feed location. Catalyst is introduced, via conduits to catalyst feeds 44 which each provide a zone for catalyst introduction. In the embodiments illustrated in FIG. 2, the catalyst feeds 44 are also symmetrically arranged around the reactor. The loop reactor further includes means for removing a portion of the slurry from the reactor (product take-offs). The means for removing the slurry portion may be a settling let, a hollow appendage for continuous take-off, or another conduit for removing the product slurry without substantial leakage or interference with the loop reactor operation. In FIG. 2, elongated hollow appendages for continuously taking-off an intermediate product slurry are designated by reference character 34. Continuous take-off mechanism 34 is located in or adjacent to one of the lower horizontal reactor loop sections 16, and/or adjacent or on a connecting elbow 20.

It has been determined that specific polyolefin properties, and in particular polyolefin density, can be controlled as a function of melt index. In particular, it has been determined that when forming multi-modal polyolefins, the multi-modal polymer density can be controlled by controlling the melt index of the first polyolefin (i.e., the polyolefin present in the transfer effluent withdrawn from the first reaction zone). This may be in combination with or apart from maintaining an essentially constant comonomer:olefin monomer ratio in the second reaction zone as discussed previously herein.

The melt index of the first polyolefin can be measured via methods known in the art. Alternatively, the melt index of the first polyethylene can be measured by use of Ramen spectroscopy. For example, a Ramen probe may be inserted into the transfer effluent to measure the melt index of the first polyethylene present therein to provide real time measurement of the melt index and any resulting adjustments for control thereof. Alternatively, samples may be drawn from the transfer effluent to analyze and determine the melt index of the first polyethylene.

Alternatively to the transfer effluent, it is contemplated that when separation processes are utilized with the first reaction zone product (as described previously herein), the melt index of the first polyethylene can be measured in the heavier stream (which may or may not be introduced into the second reaction zone depending on whether the separation occurs in a second effluent or the transfer effluent).

To further illustrate determination of the melt index and density correlation, sample calculations are included below as well as illustrations correlating density of the first fraction (i.e., the first polyethylene) and the second fraction (formed in the second reaction zone) as well as the final bimodal polyethylene density.

TABLE 4

Density correlation between polymer fractions

| Fraction 1 % | Fraction 2 % | Fraction 1 density | Fraction 2 density | Final product density |
|---|---|---|---|---|
| 0.5 | 0.5 | 0.9600 | 0.9250 | 0.9422 |
| 0.5 | 0.5 | 0.9650 | 0.9250 | 0.9446 |
| 0.5 | 0.5 | 0.9700 | 0.9250 | 0.9470 |
| 0.5 | 0.5 | 0.9750 | 0.9250 | 0.9493 |
| 0.4 | 0.6 | 0.9600 | 0.9250 | 0.9387 |
| 0.4 | 0.6 | 0.9650 | 0.9250 | 0.9406 |
| 0.4 | 0.6 | 0.9700 | 0.9250 | 0.9425 |
| 0.4 | 0.6 | 0.9750 | 0.9250 | 0.9444 |
| 0.6 | 0.4 | 0.9600 | 0.9250 | 0.9457 |
| 0.6 | 0.4 | 0.9650 | 0.9250 | 0.9486 |
| 0.6 | 0.4 | 0.9700 | 0.9250 | 0.9515 |
| 0.6 | 0.4 | 0.9750 | 0.9250 | 0.9544 |

As shown in Table 4, the density in Fraction 2 remains essentially constant (as desired and discussed previously herein with regards to maintaining an essentially comonomer:olefin monomer ratio). Accordingly, the Fraction 1 density is adjusted when a change in final product density is desired.

FIGS. 3 and 4 illustrate the correlation between melt index and density for 2 different, polymer systems. When provided with 3 polymer samples formed in a system that have been analyzed for melt index and density, a regression may be undertaken on those 3 samples to determine the correlation between melt index and density. For example, the correlation between melt index and density for the essentially linear system illustrated in FIG. 3 is MI=10498*density−9973.1. Accordingly, once a correlation is made between the melt index and density (e.g., the density of the desired fraction, such as Fraction 1), the target melt index for that fraction can be correlated, measured and controlled to result in a final product having a pre-determined target density.

Control may be accomplished via methods known in the art, such as adjusting the hydrogen:olefin monomer ratio to the first reaction zone. Further, it is to be understood that the relationship between melt index and density can vary by system but one skilled in the art can determine the response based on the techniques described herein without undue experimentation.

In one or more specific embodiments, the multi-modal polyolefin is an ethylene based polymer. Unless otherwise specified, the term "ethylene based polymer" refers to polyethylene having at least about 50 wt. %, or at least about 80 wt. %, or at least about 85 wt. %, or at least about 90 wt. % or at least about 95 wt. % polyethylene based on the total weight of polymer. Accordingly, in one or more embodiments, the bimodal polyolefin includes an ethylene based polymer. For example, the bimodal ethylene based polymer may include a low molecular weight high density fraction (produced in one reaction zone) and a high molecular weight linear low density fraction (produced in the other reaction zone).

In one or more embodiments, the high molecular weight fraction exhibits a molecular weight that is greater than the molecular weight of the low molecular weight fraction. The high molecular weight fraction may have a molecular weight of greater than 100,000, for example. In contrast, the low molecular weight fraction may have a molecular weight of from 15,000 to 50,000, for example. The bimodal polyolefin may include more high molecular weight fraction than low molecular weight fraction. For example, the bimodal polyolefin may include greater than 50 wt. % high molecular weight fraction, for example. Alternatively, the bimodal polyolefin may include less high molecular weight fraction than low molecular weight fraction. For example, the bimodal polyolefin may include less than 50 wt. % high molecular weight fraction, for example. The average molecular weight of the bimodal polyolefin (or a fraction thereof) is herein generally referred to as "molecular weight". In practice, the average molecular weight of the bimodal polyolefin may be the number average, weight average, viscosity average, z average z+1 average, as well as other average characterizations.

Alternatively, the various fractions of the bimodal polyethylene may be referred to as a first polyethylene fraction and a second polyethylene fraction. The high molecular weight fraction and the low molecular weight fraction may be the same as either the first or second polyethylene fraction depending upon the polymerization conditions. However, the first polyethylene fraction is formed in the first reaction zone while the second reaction zone is formed in the second reaction zone. In one or more embodiments, the first polyethylene fraction is the low molecular weight fraction, while the second polyethylene fraction is the high molecular weight fraction. In one or more specific embodiments, the bimodal polyethylene includes at least 40% first polyethylene fraction. In other embodiments, the bimodal polyethylene includes from 40$ to 60% first polyethylene fraction.

Each fraction of the bimodal polyethylene may have a density (as measured by ASTM D-792) of from about 0.86 g/cc to about 0.98 g/cc, or from about 0.88 g/cc to about 0.965 g/cc, or from about 0.90 g/cc to about 0.965 g/cc or from about 0.925 g/cc to about 0.97 g/cc, for example.

In one or more embodiments, one or more of the fractions may include high density polyethylene. As used herein, the term "high density polyethylene" refers to ethylene based polymers having a density of from about 0.94 g/cc to about 0.97 g/cc, for example.

In one or more embodiments, one or more of the fractions may include low density polyethylene. As used herein, the term "low density polyethylene" refers to ethylene based polymers having a density of less than about 0.92 g/cc, for example.

The polyolefins and blends thereof are useful in applications known to one skilled in the art, such as forming operations (e.g., film, sheet, pipe and fiber extrusion and co-extrusion, as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

CLOSING OF THE DETAILED DESCRIPTION

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations axe intended to the details of construction or design herein shown, other than as described in the claims below. It is therefore evident that, the particular illustrative embodiments disclosed above may be altered, combined, or modified and all such variations are considered within the scope and spirit of the present invention.

The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A process of forming polyolefins comprising:
    introducing olefin monomer selected from $C_2$-$C_3$ olefins into a first reaction zone under first polymerization conditions to form a first polyolefin;
    withdrawing a transfer effluent from the first reaction zone, the transfer effluent comprising first polyolefin and unreacted olefin monomer;
    introducing the transfer effluent, a comonomer selected from $C_4$-$C_8$ olefins, and additional olefin monomer to a second reaction zone under second polymerization conditions to form a second reactor product;
    maintaining an essentially constant comonomer:olefin monomer ratio in the second reaction zone; and
    withdrawing at least a portion of the second reactor product, wherein the second reactor product comprises a bimodal polyolefin.

2. The process of claim 1, wherein the olefin monomer comprises ethylene.

3. The process of claim 2, wherein the comonomer comprises hexene.

4. The process of claim 1, wherein the first reaction zone, the second reaction zone or a combination thereof comprise a loop slurry reaction vessel.

5. The process of claim 1, wherein the second reaction zone comprises a loop slurry reaction vessel and the loop slurry reaction vessel comprises a plurality of olefin feed locations, comonomer feed locations, hydrogen feed locations, or a combination thereof.

6. The process of claim 1, wherein maintaining a comonomer:olefin monomer ratio essentially constant comprises determining a concentration of carry over olefin monomer in the transfer effluent; and adjusting a rate of introduction of the additional olefin monomer into the second reaction zone, adjusting a rate of introduction of the comonomer into the second reaction zone or a combination thereof in response to the carry over olefin monomer concentration.

7. The process of claim 6, wherein the carry over olefin monomer concentration is determined by a process comprising:

irradiating in-situ the transfer effluent;
measuring scattered energy from the transfer effluent; and
determining from the measured scattered energy the carry over olefin monomer concentration.

8. The process of claim 6, wherein the carry over olefin monomer concentration is determined by calculating the production rate of first polyolefin in the first reaction zone.

9. The process of claim 8, wherein the production rate of the first polyolefin in the first reaction zone is determined from the calculated reaction quotient ($Q_{rxn}$) and the heat of polymerization per unit of polyolefin produced.

10. The process of claim 6, wherein the carry over olefin monomer concentration is determined by performing an energy balance calculation for the first reaction zone.

11. The process of claim 1, wherein the bimodal polyolefin comprises a first polyethylene fraction having an average molecular weight of from 15,000 to 50,000 and a second polyethylene fraction having an average molecular weight of greater than 100,000.

12. The process of claim 11, wherein the bimodal polyolefin comprises at least 40% first polyethylene fraction.

13. The process of claim 11, wherein the bimodal polyolefin comprises from 40% to 60% of the first polyethylene fraction.

14. A process of forming polyolefins comprising:

introducing olefin monomer selected from $C_2$-$C_3$ olefins and hydrogen into a first reaction zone under first polymerization conditions to form a first polyolefin;

withdrawing a transfer effluent from the first reaction zone, the transfer effluent comprising first polyolefin and unreacted olefin monomer;

introducing the transfer effluent, a comonomer selected from $C_4$-$C_8$ olefins, and additional olefin monomer to a second reaction zone under second polymerization conditions to form a second reactor product;

determining a melt index of the first polyolefin in the transfer effluent, the first reaction zone or a combination thereof;

correlating density of the first polyolefin with the melt index of the first polyolefin; and adjusting a rate of introduction of the hydrogen into the first reaction zone in response to the melt index of the first polyolefin and a pre-determined bimodal polyolefin density; and withdrawing at least a portion of the second reactor product, wherein the second reactor product comprises the bimodal polyolefin.

15. The process of claim 14 further comprising separating at least a portion of the transfer effluent to form a lighter stream and a heavier stream; and determining a melt index of the first polyolefin in the heavier stream.

16. The process of claim 14, wherein the heavier stream is introduced into the second reaction zone.

17. The process of claim 15, wherein the separating comprises passing the at least a portion of the transfer effluent through a flash tank, a hydrocyclone or a combination thereof to form the lighter stream and the heavier stream.

18. A process of forming polyolefins comprising:

introducing olefin monomer selected from $C_2$-$C_3$ olefins and hydrogen into a first reaction zone under first polymerization conditions to form a first polyolefin;

withdrawing a transfer effluent from the first reaction zone, the transfer effluent comprising first polyolefin and unreacted olefin monomer;

withdrawing a second effluent from the first reaction zone;

separating at least a portion of the second effluent to form a lighter stream and a heavier stream;

introducing the transfer effluent, a comonomer selected from $C_4$-$C_8$ olefins, and additional olefin monomer to a second reaction zone under second polymerization conditions to form a second reactor product;

determining a melt index of the first polyolefin in the heavier stream;

correlating density of the first polyolefin with the melt index of the first polyolefin; and adjusting a rate of introduction of the hydrogen into the first reaction zone in response to the melt index of the first polyolefin and a pre-determined bimodal polyolefin density; and withdrawing at least a portion of the second reactor product, wherein the second reactor product comprises the bimodal polyolefin.

19. The process of claim 18, wherein the separating comprises passing the at least a portion of the transfer effluent through a flash tank, a hydrocyclone or a combination thereof to form the lighter stream and the heavier stream.

20. A process of controlling bimodal polyolefin density, the process comprising:

introducing olefin monomer selected from $C_2$-$C_3$ olefins and hydrogen into a first reaction zone under first polymerization conditions to form a first polyolefin exhibiting a first density;

withdrawing a transfer effluent from the first reaction zone, the transfer effluent comprising first polyolefin and unreacted olefin monomer;

introducing the transfer effluent, a comonomer selected from $C_4$-$C_8$ olefins, and additional olefin monomer to a second reaction zone under second polymerization conditions to form a second polyolefin exhibiting a second density;

withdrawing at least a portion of a second reactor product from the second reaction zone, wherein the second reactor product comprises a bimodal polyolefin comprising the first polyolefin and the second polyolefin and exhibiting a bimodal polyolefin density;

controlling the bimodal polyolefin density within a target density by a process comprising:

maintaining an essentially constant second density within the second reaction zone by maintaining an essentially constant comonomer:olefin monomer ratio in the second reaction zone;

determining a melt index of the first polyolefin in the transfer effluent, the first reaction zone or a combination thereof;

correlating the first density with the melt index of the first polyolefin; and adjusting a rate of introduction of the hydrogen into the first reaction zone in response to the melt index of the first polyolefin and the target density.

21. The process of claim 20, wherein maintaining a comonomer:olefin monomer ratio essentially constant comprises determining a concentration of carry over olefin monomer in the transfer effluent; and
   adjusting a rate of introduction of the additional olefin monomer into the second reaction zone, adjusting a rate of introduction of the comonomer into the second reaction zone or a combination thereof in response to the carry over olefin monomer concentration.

22. The process of claim 21, wherein the carry over olefin monomer concentration is determined by a process comprising:
   irradiating in-situ the transfer effluent;
   measuring scattered energy from the transfer effluent; and
   determining from the measured scattered energy the carry over olefin monomer concentration.

23. The process of claim 21, wherein the carry over olefin monomer concentration is determined by calculating the production rate of first polyolefin in the first reaction zone.

24. The process of claim 23, wherein the production rate of the first polyolefin in the first reaction zone is determined from the calculated reaction quotient ($Q_{rxn}$) and the heat of polymerization per unit of polyolefin produced.

25. The process of claim 21, wherein the carry over olefin monomer concentration is determined by performing an energy balance calculation for the first reaction zone.

26. The process of claim 20, wherein the bimodal polyolefin comprises a first polyethylene fraction having an average molecular weight of from 15,000 to 50,000 and a second polyethylene fraction having an average molecular weight of greater than 100,000.

27. The process of claim 20, wherein the bimodal polyolefin comprises at least 40% first polyethylene fraction.

* * * * *